United States Patent [19]

Bugni

[11] 4,123,775

[45] Oct. 31, 1978

[54] APPARATUS AND METHOD FOR ADJUSTING THE COLOR TEMPERATURE OF A TELEVISION RECEIVER

[75] Inventor: Anthony R. Bugni, Fort Wayne, Ind.

[73] Assignee: The Magnavox Company, Fort Wayne, Ind.

[21] Appl. No.: 792,826

[22] Filed: May 2, 1977

[51] Int. Cl.² .................... H04N 9/62; H04N 9/535
[52] U.S. Cl. .................................... 358/10; 358/29
[58] Field of Search ................................ 358/10, 29

[56] References Cited

U.S. PATENT DOCUMENTS

| 3,479,448 | 11/1969 | Kollsman | 358/10 X |
| 3,573,352 | 4/1971 | Fujita | 358/29 |
| 3,688,184 | 8/1972 | Baum | 358/10 X |
| 3,735,026 | 5/1973 | Smith et al. | 358/29 |
| 3,751,580 | 8/1973 | Metzger | 358/10 X |
| 3,804,531 | 4/1974 | Kosaka et al. | 358/10 X |
| 3,821,789 | 6/1974 | Durbin, Jr. et al. | 358/29 X |
| 3,962,722 | 6/1976 | Ciciora | 358/10 |

OTHER PUBLICATIONS

"Automatic Colorimeter", Electronics, Dec. 1955, pp. 138-141.

Primary Examiner—Robert L. Griffin
Assistant Examiner—Aristotelis M. Psitos
Attorney, Agent, or Firm—George R. Pettit

[57] ABSTRACT

Apparatus and method for establishing the proper signal levels for exciting the red, green, and blue inputs to a picture tube in a color television receiver are described. An R. F. signal for producing illumination of a limited portion of a color picture tube face is supplied to the color television receiver. Another signal, from the apparatus, is connected to the video amplifier of the receiver to maintain the picture tube light output level constant at one or the other of two predetermined levels. A plurality of photo diodes, color filters, and electrical circuits are used to monitor the level of red, green, and blue light produced in response to the signal. The proper color temperature is realized by adjusting the gain of the R, G, and B amplifiers while monitoring the respective levels of green, red and blue light produced by the picture tube.

4 Claims, 4 Drawing Figures

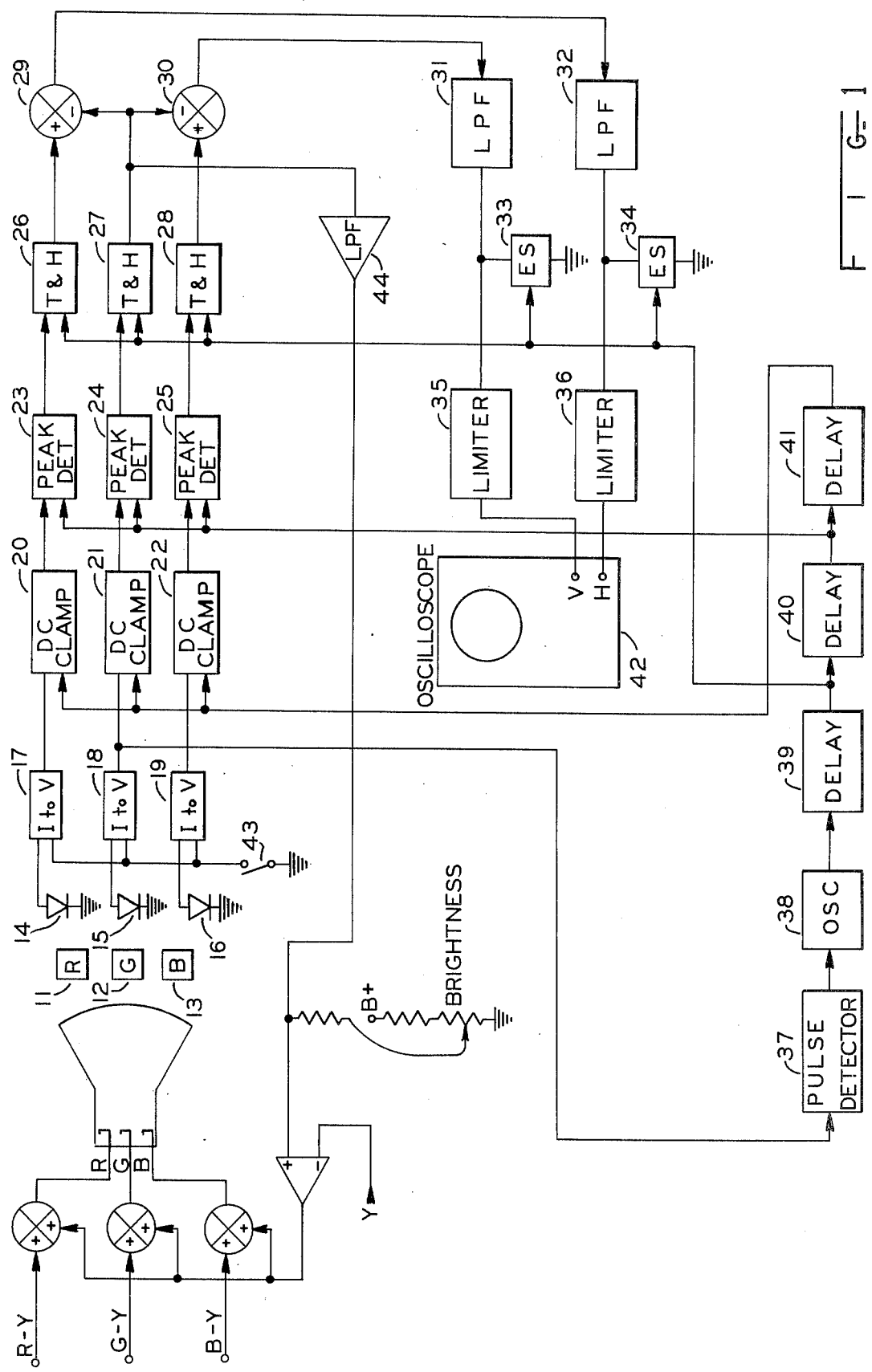

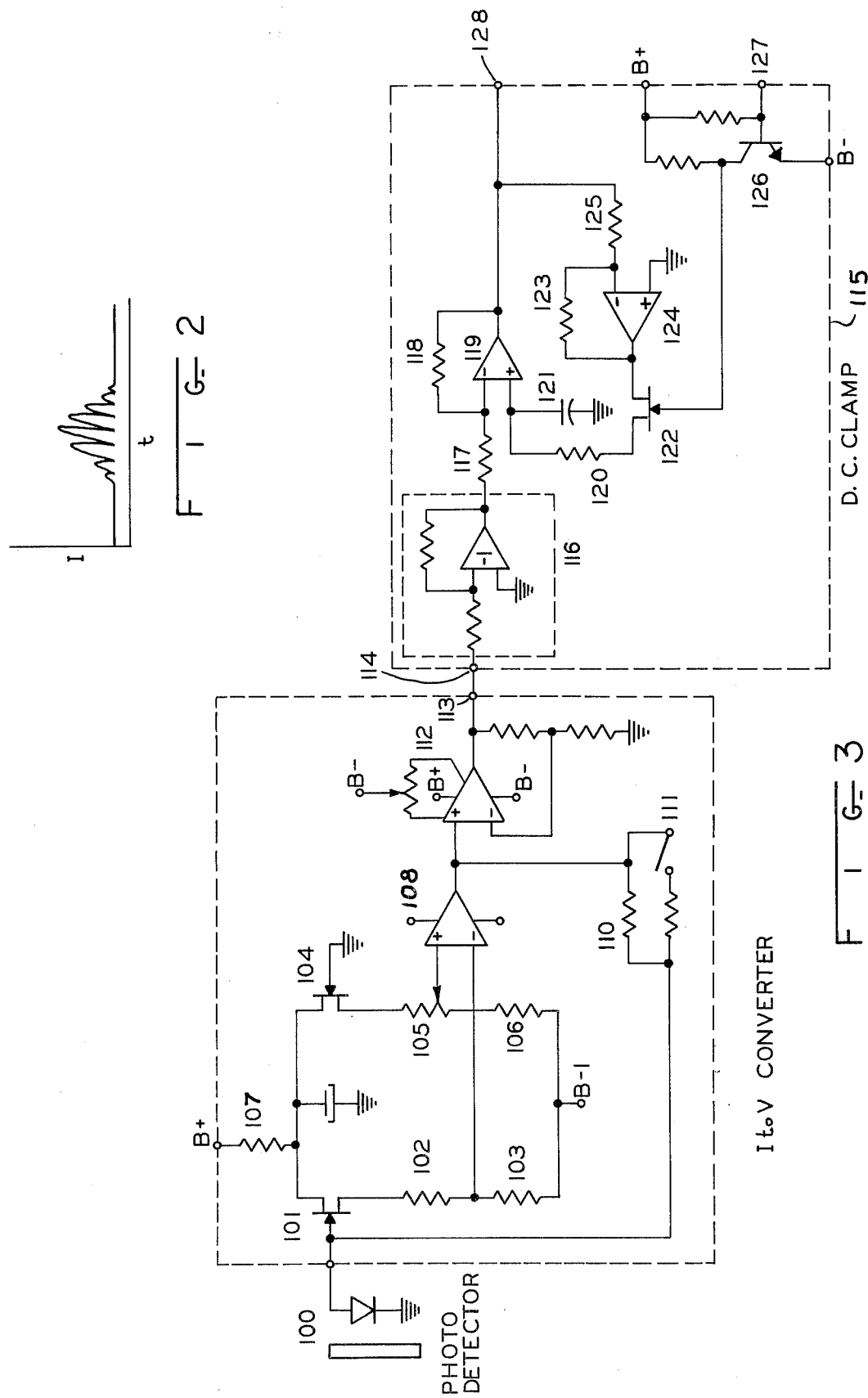

APPARATUS AND METHOD FOR ADJUSTING THE COLOR TEMPERATURE OF A TELEVISION RECEIVER

BACKGROUND OF THE INVENTION

This invention relates to the test and alignment of color television receivers which are in the final stages of production. Specifically, apparatus and methods are provided for establishing the color temperature of a color television receiver in a rapid and expeditious manner.

Color television receivers require a number of adjustments during the final phases of manufacture before delivering the receiver to a consumer. In the past, one of the more time consuming adjustments was establishing the proper picture tube color temperature. The difficulty in achieving the proper color temperature results from differences in the efficiency of the apparatus used for generating each of the primary colors. Color temperature has been achieved in the past by having an operator adjust the relative outputs from the receiver R, G and B amplifiers until a proper color is displayed. This technique is, however, very subjective and varies from person to person. Also, the color temperature of the picture changes depending upon the brightness level of a given scene. Therefore, two adjustments for color temperature are provided, one for high brightness levels and another for low brightness levels.

Generation of the primary colors in a picture tube is accomplished by selectively exciting a phosphor surface. The phosphor surface comprises alternate dots or stripes of different colored light emitting phosphors. The phosphor stripes or dots give off red, green or blue light when selectively excited by one of three electron guns. The phosphors which produce light of different colors have different light producing efficiencies. Therefore, the electron gun which illuminates a phosphor having a low light producing efficiency must be driven with a signal having a greater amplitude than an electron gun which illuminates a higher efficiency phosphor for producing a different color.

Adding to the inherent differences in efficiency of different color producing phosphors are differences in efficiencies of the electron guns which produce the electron beam for selectively exciting the phosphors which produce the different colors. These differences in efficiencies must also be compensated for by applying different levels of input signals to the respective electron guns.

Another problem which occurs in establishing color temperature are changes in the brightness of the picture tube which affects the color temperature. Therefore, a means for holding the brightness level constant during the color temperature adjustment is desirable.

SUMMARY OF THE INVENTION

It is therefore an object of this invention to provide an apparatus for establishing color temperatures of a color television receiver during final production.

In accordance with one aspect of the invention, apparatus is provided to measure the relative amounts of primary colors produced by a segment of a television receiver color picture tube. An R. F. video signal is supplied to the color television receiver to illuminate a segment of the picture tube at a constant brightness level. Another signal controlling this segment's brightness is also supplied to this receiver. Three color sensitive optical detectors are coupled to the illuminated segment of the screen. Means for periodically sampling the relative output of each optical detector are provided. The sampled outputs are supplied to a means for comparing the relative magnitude of the sampled outputs and adjustments are thereafter made to the television receiver until a proper ratio between the respective primary colors is established indicating a proper color temperature.

DESCRIPTION OF THE FIGURES

FIG. 1 is a block diagram of one embodiment of this invention for adjusting the color temperature of a television receiver operatively connnected to a television receiver.

FIG. 2 is a graph of the output signal from a light sensor employed in the circuit of FIG. 1.

FIG. 3 is a schematic drawing of a circuit for implementing a I to V converter and a d.c. clamp circuit.

DESCRIPTION OF THE PREFERRED EMBODIMENT

Figure 4:
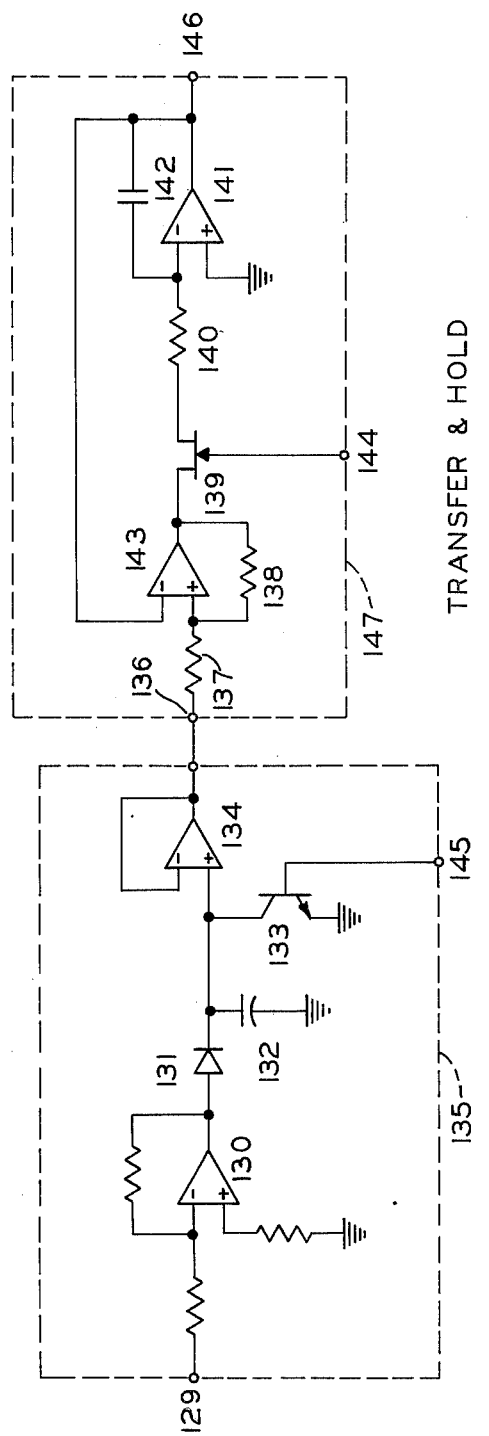
FIG. 4 is a schematic drawing of circuitry used as a peak detector and a transfer and hold circuit.

Referring now to FIG. 1, there is shown a block diagram of one embodiment of this invention operatively coupled to a color picture tube of a television receiver. Three color filters 11, 12 and 13 having a passband for either red, green or blue light are placed over the portion of the picture tube which is being illuminated at a constant brightness level in response to a signal applied to the television receiver antenna terminals.

Located rearwardly of the filters are three photo sensitive diodes 14, 15, 16 which produce a current proportional to the amount of light passing through the respective filters. The current through the diodes is converted into a voltage level which may be sampled to determine the relative amounts of red, blue and green light produced in the illuminated segment.

Referring now to FIG. 2, the output current of a diode as a function of time is shown. The maximum current is produced every time a horizontal scan line generated by a picture tube intersects the center of the diode. Given the fact that the photodiode current does change with time, it is necessary to sample the diode current at the same horizontal line during successive vertical fields. The current through each diode is sampled at its peak value to determine the relative light levels being detected by each photodiode.

The photodiodes are operatively connected to a plurality of current to voltage (I/V) converters 17, 18 and 19 to establish a voltage level proportional to the current produced by each diode. The output of the I/V converters are supplied to d.c. clamp ciruits 20, 21 and 22 for maintaining a constant d.c. voltage in the absence of a signal from an I/V converter. This is necessary because the d.c. output voltage from the I/V converters will drift over time due to changes in the components used in the I/V converters.

The d.c. clamp is operated in response to a periodic pulse which alternately charges or discharges a capacitor depending upon whether the d.c. output voltage from the I/V converter has drifted up or down. The capacitor voltage thereby establishes a constant output voltage for the d.c. clamp circuit 20, 21 and 22 in a manner to be explained with later reference to FIG. 3.

The output of each d.c. clamp circuit 20, 21 and 22 is supplied to an input of peak detector circuits 23, 24 and 25. The peak detector circuits 23, 24 and 25 store a peal voltage which is produced by the I to V converters for each vertical field produced by the television receiver. At the end of each vertical field, the peak detector circuits 23, 24 and 25 are initialized to produce zero volts until a subsequent field is scanned by the electron guns.

The initialization of the peak detector requires removal of a voltage proportional to the peak output current of the photodiodes produced during a previously scanned frame. The initializaton is accomplished after the electron beam has completed illuminating the test segment on the picture tube. A pulse detector 37 provides a signal when an incremental change in the output of I to V converter 17 occurs. This change in output will occur when an electron gun causes phospher located within the light receiving aperture of photodiode 15 to be illuminated.

Pulse detector 37 provides a signal for synchronizing an oscillator 38. In practice, this oscillator 38 may be an astable multivibrator which is reset everytime a signal is supplied from pulse detector 37.

The oscillator 38 signal is delayed by a series of delay circuits 39, 40 and 41. Each delay circuit provides 3 milliseconds of delay to the oscillator signal. Therefore, after 6 milliseconds, a pulse for causing the peak detectors 23, 24 and 25 to be initialized is generated.

The peak detectors 23, 24 and 25 output voltages are transferred before being initialized to zero volts to hold circuits 26, 27 and 28. The hold circuits receive a pulse from delay circuit 39. The receipt of this pulse transfers the voltages produced at the output of each of the peak detectors to a plurality of hold circuits 26, 27 and 28. The transfer of these voltages is accomplished 3 milliseconds before the peak detectors are to be initialized.

The hold circuits 26, 27 and 28 present a plurality of voltages which indicate the relative amount of light produced by different color phosphors which are being excited. The voltages are used to indicate the color temperature produced by the color picture tube.

One convenient way of comparing the voltages produced by transfer and hold circuits 26, 27 and 28 is shown in FIG. 1. An oscilloscope 42 is used to operate as a pseudo three dimensional display. The voltage representing the light output fom the green light producing phosphor is subtracted from the voltages generated in response to the light output from the red and blue light producing phosphors by substractor circuits 29 and 30. The resulting difference signals are filtered by low pass filters 31 and 32 to remove any high frequency noise and applied to the horizontal and vertical inputs of the oscilloscope 42. Two limiters 35 and 36 are used to limit voltages which are produced by low pass filters 31 and 32. These limiters 35 and 36 keep the horizontal and vertical deflection voltages below a level which locate the CRT electron beam off the face of the oscilloscope.

The location of the oscilloscope's beam describes the relative magnitudes of light output from the illuminated red, green and blue light producing phosphors. When the three transfer and hold circuits 26, 27 and 28 have the same output voltage, the oscilloscope 42 will provide a dot at the origin of the oscilloscope axises.

With the foregoing oscilloscope 42 display, it is possible to weight the respective gains of the I/V converters to provide a dot at the origin of the 3 axises when a proper color temperature is detected. This would correspond to a condition of $R-G=0$ and $B-G=0$. A second possibility is to place attenuator networks between the peak detector circuits and the transfer and hold circuits having a weighting which produces a null when a proper color temperature is achieved.

Two electronic switches 33 and 34 are connected at the output of the low pass filters 31 and 32 to establish a null reference on the face of the oscilloscope. The switches 33 and 34 when activated by a pulse from delay circuit 39 momentarily connect the inputs of the oscilloscope 42 to ground potential. This produces a dot on th oscilloscope's face indicating where a null condition of zero volts exists.

The operator may therefore adjust the gain of the R, G and B amplifiers in a television receiver until a null condition is produced on the oscilloscope when the aforementioned weighting is employed. Also, a switch 43 is employed to decrease the gain of the I/V converters to allow the color temperature adjustment to be completed at a higher brightness level. There is shown in FIG. 1 a feed back network 44 connecting the output of transfer and hold circuit 27 to the brightness input of the television receiver. The feedback network 44 will provide a signal for maintaining the brightness constant while establishing the color temperature of the color receiver. The feedback network comprises an active low pass filter having a d.c. gain sufficient to maintain a desired brightness level. The filter is selected to have a frequency response which will keep the system from oscillating. A constant brightness level is required in order to establish consistent color temperature for each receiver to be aligned. The adjustments for establishing the proper color temperature are normally completed at two different brightness levels. A switch 43 is used to change the gain of I/V converters. Changing the gain will produce a different light output level by altering the level of the feedback signal supplied by feedback network 44. In the preferred embodiment the two brightness levels used for establishing the color temperature are 1 ft. lamberts and 100 ft. lamberts. The gain of the R, G and B amplifiers are altered to achieve the proper color temperature at the 1 ft. lambert level and the screens for the picture tubes are selectively biased to achieve the proper color temperature for the 100 ft. lambert light level.

Referring now to FIG. 3 there is shown detailed circuitry of apparatus used in one embodiment of the invention for implementing the current to voltage converter, and d.c. clamp circuit of the apparatus shown in FIG. 1. Those skilled in the art will recognize that many other circuits are useful for accomplishing the functions described by FIG. 1.

A photodiode 100 which has a current proportional to the amount of light incident on the diode is connected to the gate of a field effect transistor (FET) fior developing a voltage proportional to the current through the diode 100. The field effect transistor provides a very high impedance input and isolates the diode from the remaining circuitry. The source of FET 101 is connected to two resistors 102 and 103. The connection of resistors 102 and 103 is thereafter connected to a source of negative potential. The operation of the FET is such that a voltage change will be experienced at the junction of resistors 102 and 103 as a change in current occurs in diode 100. However, changes in voltage will also be produced at the junction of resistor 102 and 103 due to temperature changes.

To compensate for the temperature changes which cause a voltage to be produced at the junction of resistors 102 and 103, a second FET 104 is connected in a similar manner. FET 104 has a gate which is connected to ground, and a source connected to a potentiometer 105 and a series resistor 106. By measuring the voltage differential between the wiper arm of the potentiometer 105 and the junction of resistor 102 and 103, the temperature effects seen by amplifier 108 will be minimized. This occurs because a corresponding temperature change occurs in FET 104 causing a corresponding change in the potential at the wiper arm of potentiometer 105. The drain connections of FET 101 and FET 104 are returned through a resistor 107 to a source of positive voltage.

An operational amplifier 108 measures the differential voltage between the junction of resistors 102 and 103 and the wiper arm of potentiometer 105. The output of differential amplifier 108 is connected through a feedback resistor 110 to the gate of FET 101. By changing the value of the feedback resistor 110, the magnitude of the voltage produced at the output of amplifier 108 may be changed. A switch 111 is provided for effecting a change in gain of the current to voltage converter by merely changing the value of feedback resistor 110, the load impedance seen by the diode 100.

The voltage produced by amplifier 108 being directly proportional to the current through diode 100 is further amplified by an amplifier 112. This amplified level is supplied to a terminal 113 for delivery to other circuitry in the apparatus of FIG. 1.

A d.c. clamp circuit 115 is shown in FIG. 3 for use in the apparatus described more generally in FIG. 1. An amplifier 116 having a gain of -1 supplies a signal from terminal 113 to a resistor 117, the resistor being connected to the inverting input (henceforth called the negative input) of an operational amplifier 119. The noninverting input (henceforth called the positive input) to the operational amplifier 119 is connected to a capacitor 121. The remaining end of capacitor 121 is grounded. The resistor 120 connects the positive input of the operational amplifier 119 to the source of a FET 122. The drain of the transistor is connected to the output of an operational amplifier 124. The operational amplifier 124 is operated in the inverting mode, and receives a signal from the output of operational amplifier 119. FET 122 is operated in response to a signal provided by transistor 126.

The d.c. clamp 115 operates in the following manner. When a pulse is received on terminal 127, FET 122 is caused to conduct thereby connecting the output of amplifier 124 to resistor 120. If the the output of amplifier 119 is not 0, an error voltage will be generated by amplifier 124. This error voltage cause the potential on capacitor 121 to change in a direction which will minimize the error voltage. Therefore, each time a pulse is applied to terminal 127 capacitor 121 will assume a value which will cause a long term voltage of zero volts to be applied to terminal 128. The net effect of the d.c. clamp is to keep the d.c. level at terminal 128 to zero volts, and the signal delivered by the I to V converter will be clamped at zero volts, in the interval during which the diode is not being scanned and its output current is zero.

Referring now to FIG. 4, a peak detector 135 receives an input voltage from terminal 129. The input voltage is amplified and inverted by amplifier 130 and thereafter supplied to a diode 131. A capacitor 132 is connected to the cathode terminal of diodes 131 and stores a voltage proportional to the peak voltage supplied by amplifier 130. The voltage stored at capacitor 132 is buffered by amplifier 134. Connected across the capacitor 132 is a transistor 133. When a pulse is applied to terminal 145 of the peak detector, the capacitor 132 is completely discharged.

A transfer and hold circuit 147 receives an input signal from the peak detector 135 through terminal 136. Operational amplifier 143, resistors 137 and 138 amplify the error voltage between terminals 146 and 136 and apply it to a FET switch 139. The FET switch 139 will transfer the voltage at the output of amplifier 143 to a capacitor 142 when a pulse is applied to terminal 144 of the transfer and hold circuit 147. Resistor 140 connects the negative input of amplifier 141 to the FET source. The capacitor 142 is connected between the inverting input of amplifier 141 and the output terminal of amplifier 141.

The operation of the transfer and hold circuit is such that when a large negative voltage is applied to terminal 144, FET 139 will be turned off and the voltage on capacitor 142 will keep the output voltage at terminal 146 constant. When a more positive voltage, near zero volts, is applied to terminal 144, FET 139 becomes a closed switch and the output voltage from amplifier 143 will cause a voltage to be stored on capacitor 142 proportional to the peak detector output voltage. In this manner, each time the terminal 144 receives a pulse, the voltage presented by the peak detector is stored at capacitor 142, and the output of amplifier 141 is this voltage stored on capacitor 142.

Thus there has been described with respect to specific circuitry apparatus for supplying voltage levels proportional to the light incident on a photodiode. The remaining portions of the apparatus of FIG. 1 are standard circuits which have previously been described in sufficient detail. The figures are illustrative only of many circuits for accomplishing the apparatus described in the claims which follow.

What is claimed is:

1. An apparatus for determining the difference in color temperature between a television receiver having a partially illuminated color picture tube, and a reference color temperature comprising:
   a. means for illuminating a segment of said picture tube to produce a constant brightness level;
   b. light detector means for providing first, second, and third signals in response to the amount of red, green and blue light produced within said segment;
   c. means for sampling said first, second and third signals of said light detectors to provide a voltage representative of said signals; and
   d. means for comparing said voltages representing said first, second and third signals whereby the relative magnitude of each voltage level is indicative of said reference color temperature.

2. A method for establishing the color temperature of a television receiver, said color television receiver having a color picture tube with red, green and blue inputs for exciting a plurality of red, green and blue phosphors, and signal processing circuits for supplying signals to said inputs, comprising the steps of:
   a. illuminating a segment of said picture tube to produce a known brightness level;
   b. individually sensing the intensity of light produced by said red, green and blue phosphors within said illuminated segment and providing first, second and third output signals for identifying the intensity produced by said red, green and blue phosphors within said illuminated portion of said picture tube;

c. sampling and interpreting said first, second and third signals at a predetermined time interval to provide voltages proportional to the average light intensity indicated by said first, second and third signals;

d. comparing said voltages with respect to one another to determine the relative light output from said red, blue and green phosphors whereby the relative mangitude of the respective voltages is indicative of the color temperature; and e. adjusting the level of said signals entering said inputs until a predetermined relationship between said voltages indicating a proper color temperature is achieved.

3. The apparatus of claim 1 whereby said means for comparing said voltages comprises a first subtractor network for subtracting said voltage representing the intensity produced by said green phosphors from said voltage representing the intensity produced by said red phosphors; a second subtractor network for subtracting said voltage representing said green phosphor intensity from said voltage representing said blue phosphor intensity; and an oscilloscope, said oscilloscope having its vertical input and horizontal input connected to the output of said first and second subtractor, whereby said oscilloscope will generate display for determining the relative mangitude of the intensity produced by said red, green and blue phosphors.

4. The apparatus of claim 1 wherein said means for maintaining the brightness level constant comprises a feedback network for supplying a signal to the brightness control input of said television receiver, said signal being proportional to one of said voltages representing a particular phosphor intensity.

* * * * *